(12) United States Patent
Kobayashi et al.

(10) Patent No.: US 10,272,345 B2
(45) Date of Patent: Apr. 30, 2019

(54) INFORMATION PROCESSING APPARATUS

(71) Applicant: Sony Computer Entertainment Inc., Tokyo (JP)

(72) Inventors: Motoki Kobayashi, Tokyo (JP); Shigeru Enomoto, Kanagawa (JP); Nobukazu Koyama, Tokyo (JP); Yuji Nakamura, Tokyo (JP); Akitsugu Tsuchiya, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 67 days.

(21) Appl. No.: 14/893,147

(22) PCT Filed: Feb. 21, 2014

(86) PCT No.: PCT/JP2014/000916
§ 371 (c)(1),
(2) Date: Nov. 23, 2015

(87) PCT Pub. No.: WO2014/196106
PCT Pub. Date: Dec. 11, 2014

(65) Prior Publication Data
US 2016/0121223 A1 May 5, 2016

(30) Foreign Application Priority Data
Jun. 7, 2013 (JP) .................................. 2013-121140

(51) Int. Cl.
*A63F 13/795* (2014.01)
*A63F 13/87* (2014.01)
*G06Q 10/10* (2012.01)

(52) U.S. Cl.
CPC ............ *A63F 13/795* (2014.09); *A63F 13/87* (2014.09); *G06Q 10/107* (2013.01)

(58) Field of Classification Search
None
See application file for complete search history.

(56) References Cited

U.S. PATENT DOCUMENTS 7,828,661 B1 * 11/2010 Fish .................. A63F 13/87
463/42
8,242,902 B2    8/2012 Oh
(Continued)

FOREIGN PATENT DOCUMENTS

JP     2004334412 A    11/2004
JP     2007300565 A    11/2007
(Continued)

OTHER PUBLICATIONS

Office Action for corresponding JP Application No. 2013121140, 11 pages, dated Sep. 13, 2016.
(Continued)

*Primary Examiner* — Robert T Clarke, Jr.
(74) *Attorney, Agent, or Firm* — Matthew B. Dernier, Esq.

(57) ABSTRACT

A storing section stores an invitation message giving an invitation to an application to be executed by another information processing apparatus. An information displaying section displays the invitation messages on a display device. At this point, the information displaying section displays a valid invitation message and an invalid invitation message in a manner different from each other. The information displaying section may further display an unread invitation message and a read invitation message in a manner different from each other.

15 Claims, 15 Drawing Sheets

(56) References Cited

U.S. PATENT DOCUMENTS

| | | | |
|---|---|---|---|
| 2008/0126951 A1* | 5/2008 | Sood | H04L 51/26 715/752 |
| 2009/0119678 A1* | 5/2009 | Shih | G06Q 10/10 719/313 |
| 2009/0125842 A1 | 5/2009 | Nakayama | |
| 2009/0295565 A1 | 12/2009 | Oh | |
| 2011/0043843 A1 | 2/2011 | Yamada | |
| 2011/0092280 A1 | 4/2011 | Koyama | |
| 2011/0250968 A1 | 10/2011 | Os | |
| 2011/0307807 A1* | 12/2011 | Norby | G06Q 10/101 715/758 |
| 2012/0011192 A1* | 1/2012 | Meister | G06Q 10/107 709/203 |
| 2013/0014059 A1 | 1/2013 | Nakayama | |
| 2013/0252728 A1 | 9/2013 | Kaneyoshi | |
| 2014/0121011 A1* | 5/2014 | Liu | A63F 13/12 463/31 |

FOREIGN PATENT DOCUMENTS

| | | |
|---|---|---|
| JP | 2008097104 A | 4/2008 |
| JP | 2008245987 A | 10/2008 |
| JP | 2008544720 A | 12/2008 |
| JP | 2011044779 A | 3/2011 |
| JP | 2013013445 A | 1/2013 |
| WO | 2013047166 A1 | 4/2013 |

OTHER PUBLICATIONS

International Search Report for corresponding PCT application No. PCT/JP2014/000916, 2 pages, dated May 13, 2014.

International Preliminary Report on Patentability and Written Opinion for corresponding PCT application No. PCT/JP2014/000916, 10 pages, dated Dec. 17, 2015.

* cited by examiner

FIG. 2
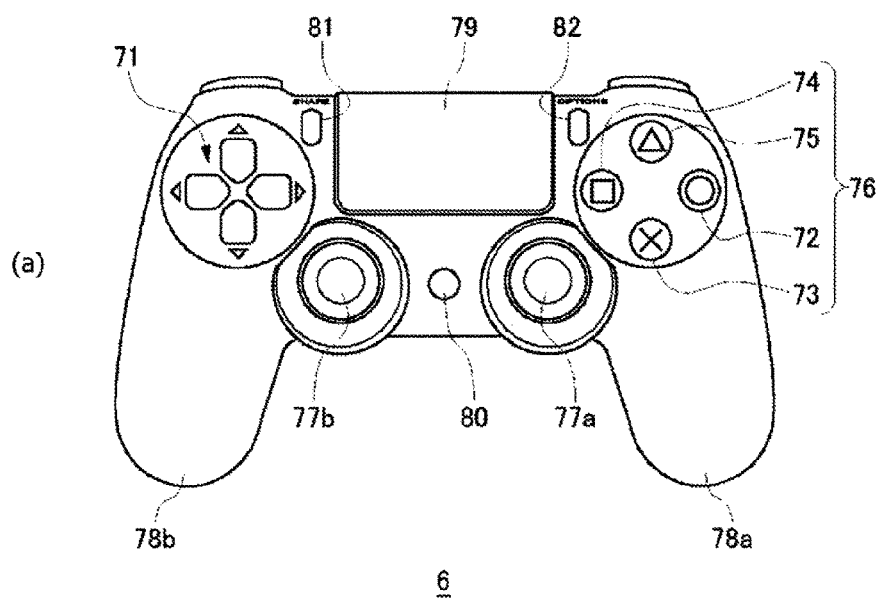
(a)
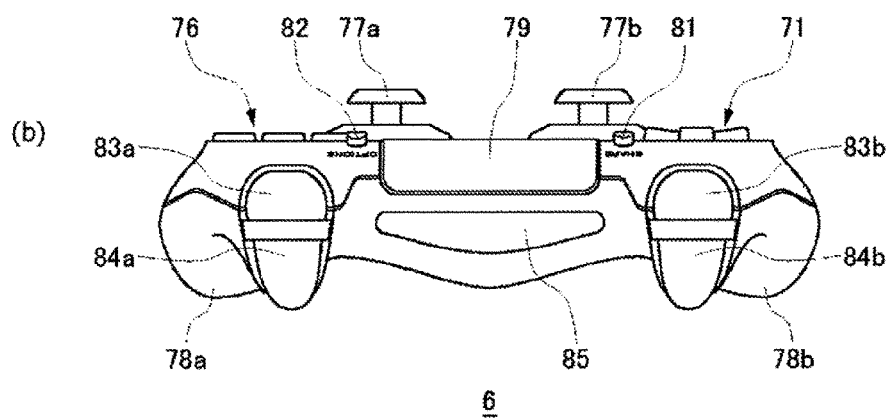
(b)

FIG. 7
(a) 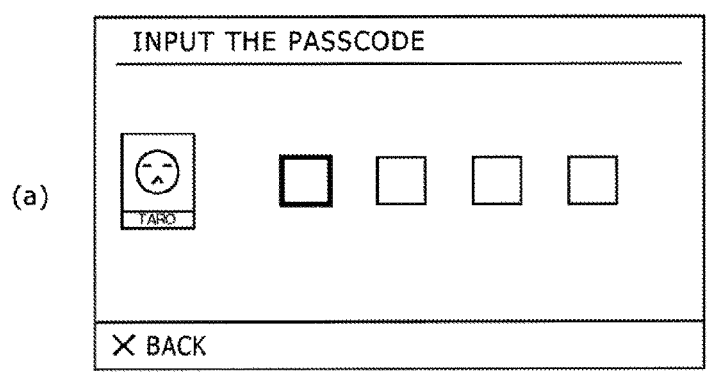
4
(b) 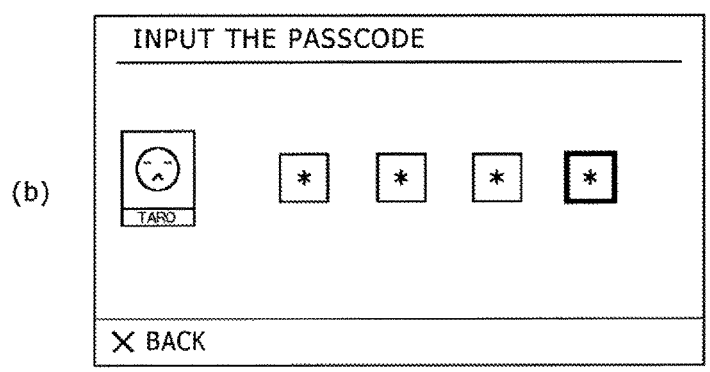
4

INFORMATION PROCESSING APPARATUS

TECHNICAL FIELD

The present invention relates to an information processing apparatus such as a game machine.

BACKGROUND ART

There has been proposed a system which, when a user has achieved a mission set in a video game, grants the user a trophy as a virtual prize for the mission accomplished (see PTL 1). The trophies won by the user on the game machine may be registered with a server connected to the Internet when the user signs in to a relevant network service. The registration allows trophy acquisition information to be synchronized between the game machine and the server. It has become common practice that the high-speed network environment, which has been provided in recent years, enables the users operating their game machines to exchange diverse kinds of information data between them.

CITATION LIST

Patent Literature

[PTL 1] U.S. Patent Application Publication No. 2011/0092280

SUMMARY

Technical Problem

With the game machine cited in PTL 1, only one user is able to log in to the operating system (OS) of the game machine. This means that, of multiple users who may play games on the game machine, only the login user can acquire trophies. If the game machine allowed multiple users to log in, each of these users could get trophies, which would contribute to enhancing the attractiveness of the game machine.

The user who signs in to the network service is allowed not only to register the trophy acquisition information with the server but also to exchange information data easily with other users. It is thus desired that the game machine have the capability to notify efficiently the user of the arrival of information data from some other game machine.

It is therefore an object of the present invention to provide a technique for efficiently notifying the user of acquired information.

Solution to Problem

In order to solve the problem described above and according to one embodiment of the present invention, there is provided an information processing apparatus including: a storing section configured to store an invitation message giving an invitation to an application to be executed by another information processing apparatus; and a display processing unit configured to display on a display device the invitation messages stored in the storing section. The display processing unit has an information displaying section configured to display a valid invitation message and an invalid invitation messages in a manner different from each other.

Incidentally, if other combinations of the above-outlined composing elements or the above expressions of the present invention are converted between different forms such as a method, a device, a system, a recording medium, and a computer program, they still constitute effective embodiment of this invention.

BRIEF DESCRIPTION OF DRAWINGS

FIG. 2(a) is a diagram illustrating an external configuration of the top of an input device, and FIG. 2(b) is a diagram illustrating an external configuration of the rear side of the input device.

FIGS. 7(a) and 7(b) are a set of diagrams illustrating passcode input screens.

FIG. 14 is a diagram illustrating an example in which a notification processing section block gives notification when multiple users have logged in.

FIG. 15 is a diagram illustrating an example in which the notification processing section gives notification when a single user has logged in.

DESCRIPTION OF EMBODIMENT

Figure 1:
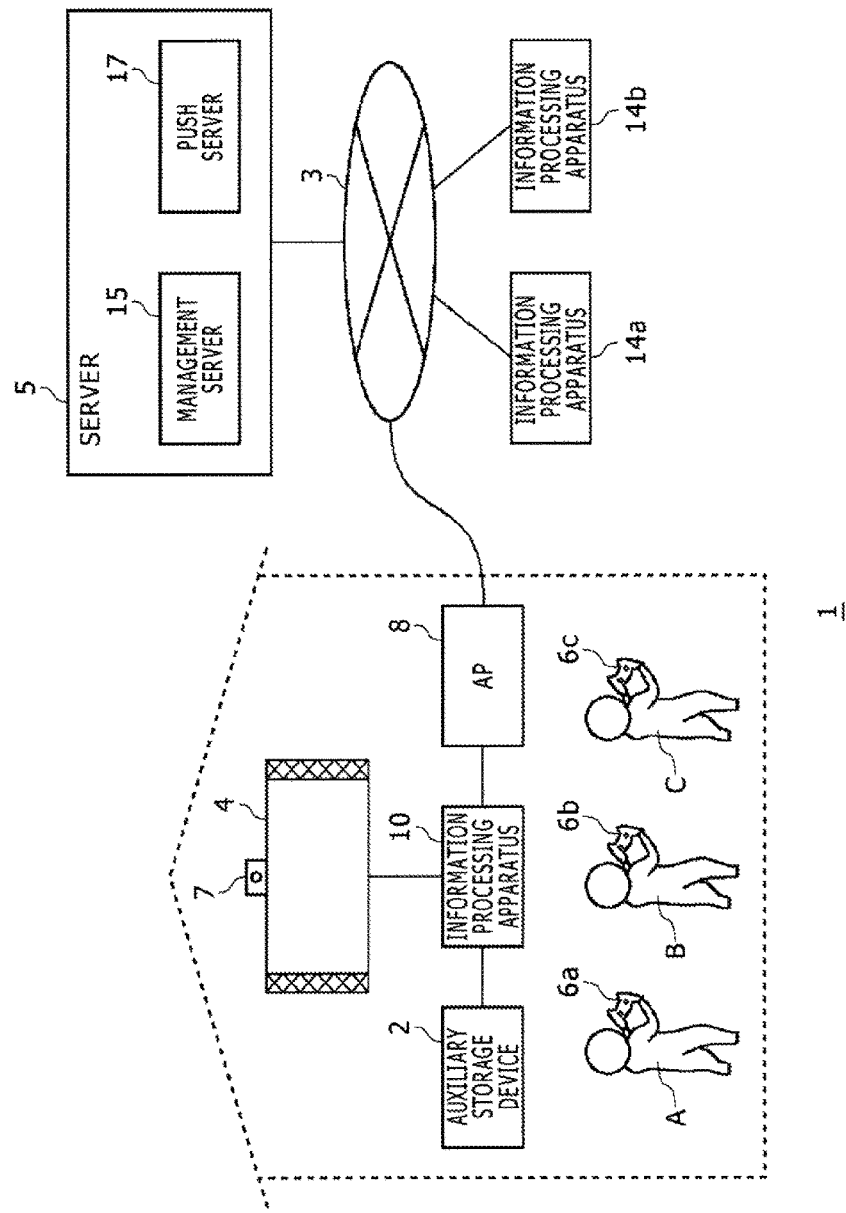
FIG. 1 is a diagram illustrating an information processing system practiced as one embodiment of the present invention.

FIG. 1 shows an information processing system 1 practiced as one embodiment of the present invention. The information processing system 1 has an information processing apparatus 10 that is a user terminal, and information processing apparatuses 14a and 14b (referred to as the information processing apparatus 14 where no distinction is made therebetween), and a server 5. In this embodiment, the information processing apparatuses 10 and 14 have the same configuration and the same functionality, but are operated by different users.

An auxiliary storage device 2 is a mass storage device such as an HDD (hard disk drive) or a flash memory. This device may be an external storage device connected with the information processing apparatus 10 through a USB (Universal Serial Bus). Alternatively, this device may be a built-in storage device. An output device 4 may be a television set having a display for outputting images and speakers for outputting audio, or may be a computer display. The output device 4 may be connected to the information processing apparatus 10 in a wired (with cable) or a wireless manner. The information processing apparatus 10 is connected in wired or wireless fashion to an input device 6 operated by a user. The input device 6 outputs to the information processing apparatus 10 operation signals indicative of the results of user operations. Upon receipt of the operation signals from the input device 6, the information processing apparatus 10 allows the signals to be reflected on the processing performed by the OS (system software) and by applications and causes the output device 4 to output processing results. The input device 6 is configured to have multiple input sections such as multiple pushbuttons, an analog stick for entering analog quantities, and a rotary button.

In the information processing system 1, the information processing apparatus 10 is a game machine for executing games. The input device 6 is a device that provides user operation signal to the information processing apparatus 10 such as a game controller. The input device 6 may also be an input interface such as a keyboard or a mouse. A camera 7 acting as an imaging device is installed near the output device 4 to obtain images of the space around the output device 4. Whereas FIG. 1 shows an example in which the camera 7 is mounted on top of the output device 4, the camera 7 may be located alternatively on one side of the output device 4. In any case, the camera 7 is located in such a manner that an image of the user playing games in front of the output device 4 will be obtained.

An access point (hereinafter referred to as "AP") 8 has the functions of a wireless access point and a router. The information processing apparatuses 10 and 14 are connected to the AP 8 in wired or wireless fashion, thereby being communicably connected to the server 5 on a network 3.

As described above, the information processing apparatus 14, which has the same configuration and the same functionality as the information processing apparatus 10, is operated by a user different from the user of the information processing apparatus 10. Although not shown, the information processing apparatus 14 is connected to the output device 4 and auxiliary storage device 2 and receives the operation signals input from the input device 6. Also, the information processing apparatus 14 may exchange information data with the information processing apparatus 10 when connected via an access point to the network 3, with or without the intervention of the server 5.

The server 5 provides network services to users of the information processing system 1. The server 5 may be physically composed of multiple servers. Each of the servers may be managed and maintained by the entity corresponding to the functionality of the server in question. In this example, the server 5 is configured to include a management server 15 and a push server 17. The management server 15 and push server 17 may each be composed of multiple servers as well.

The management server 15 manages network accounts for identifying the users utilizing the information processing system 1. Each user uses his/her network account to sign in to the network service provided by the server 5. By signing in to the network service from the information processing apparatus 10, the user is able to register with the management server 15 game save data and trophies won as virtual prizes during the play of games. The management server 15 is connected with the push server 17.

The management server 15 further provides diverse service functions to the user. Specifically, the management server 15 offers the functions such as an invitation function for inviting other users into the game being played by the user, and a message function for exchanging messages between users. One management server 15 may be provided to offer each of these service functions. For example, there may be independently provided functional servers to implement the different functions, such as a network account managing server, an invitation server, and a message server. In the information processing system 1, multiple users may play online games using the information processing apparatuses 10 and 14. The management server 15 may include a game server that manages game sessions.

Where there exists on the management server 15 information data addressed to the user, the push server 17 gives notification to that effect to the user's information processing apparatus 10. For example, suppose that user D of the information processing apparatus 14 invites user A of the information processing apparatus 10 into the currently played game. In that case, the push server 17 notifies the management server 15 that the user D is inviting the user A. Given the notification from the user D, the management server 15 generates an invitation message addressed to the user A and notifies the push server 17 that there is the invitation message addressed to the user A. In response, the push server 17 gives push notification to that effect to the information processing apparatus 10 of the user A. It should be noted that the push server 17 notifies the information processing apparatus 10 that there is an invitation message while not transmitting the invitation message to the information processing apparatus 10. The information processing apparatus 10 then accesses the management server 15 to acquire the invitation message and notifies the user A that there is newly arriving information. Push notification by the push server 17 is performed as part of the background processing by the information processing apparatus 10, so that the user gets to know the acquisition of the invitation message only after being notified of the newly arriving information.

The information processing apparatus 10 allows one or more users to log in. FIG. 1 shows three users A, B and C playing a game by use of one information processing apparatus 10. Each user logging in to the OS of the information processing apparatus 10 is able to store his/her save data into the auxiliary storage device 2 and to get a trophy every time the user achieves a mission in the game. When each user logs in, the OS associates the user with the device (input device 6). In this example, the OS associates an input device 6a with the user A, an input device 6b with the user B, and an input device 6c with the user C. This allows the game to identify the users from the information identifying the input device 6 (e.g., from the game controller ID).

FIG. 2(a) shows an external configuration of the top of the input device. A user holds a left-side grip 78b by the left hand and a right-side grip 78a by the right hand, thereby operating the input device 6. On a top housing surface of the input device 6 are the input sections made up of direction keys 71, analog sticks 77a and 77b, and four types of operation buttons 76. The four types of buttons 72 through 75 are marked with different symbols in different colors for distinction from each other. That is, the circle button 72 is marked with a red circle, the X button 73 with a blue X, the square button 74 with a violet square, and the triangle button 75 with a green triangle. On the top housing surface, a touch pad 79 is provided in a flat area between the direction keys 71 on the one hand and the operation buttons 76 on the other hand.

A function button 80 is provided between the two analog sticks 77a and 77b. The function button 80 is used to turn on power to the input device 6 and to activate simultaneously its communication function for connecting with the input processing apparatus 10. If the main power to the information processing apparatus 10 is off, pressing the function button 80 causes the information processing apparatus 10 to receive a connection request from the input device 6 as an instruction to turn on the main power, the request thereupon turning on the main power of the information processing apparatus 10. After the input device 6 is connected to the information processing apparatus 10, the function button 80 is also used to display a menu screen on the information processing apparatus 10.

A SHARE button 81 is provided between the touch pad 79 and the direction keys 71. The SHARE button 81 is used to enter the user's instructions into the OS or the system software of the information processing apparatus 10. An OPTION button 82 is further provided between the touch pad 79 and the operation buttons 76. The OPTION button 82 is used to enter the user's instructions into an application (game) that is executed on the information processing apparatus 10. The SHARE button 81 and the OPTION button 82 may each be formed as a pushbutton.

FIG. 2(b) shows an external configuration of the rear side of the input device. At the top of the housing rear side of the input device 6 is the touch pad 79 extending from the housing top. At the bottom of the housing rear is a horizontally elongated light-emitting block 85. The light-emitting block 85 has red (R), green (G), and blue (B) LEDs that are turned on in accordance with luminescent color information transmitted from the information processing apparatus 10. When three input devices 6a, 6b and 6c are used as shown in FIG. 1, the information processing apparatus 10 may determine that the light-emitting blocks 85 of the input devices 6a, 6b and 6c emit light in different colors, i.e., red, green and blue, respectively, to allow the users A, B and C to distinguish their input devices 6 from one another. Each user is thus able to recognize his/her input device 6 by the luminescent color of the light-emitting block 85, which reduces the possibility of any user using a wrong input device 6.

On the housing rear side, an upper button 83a and a lower button 84a on the left side and an upper button 83b and a lower button 84b on the right side are positioned symmetrically in a longitudinal direction. The upper button 83a and the lower button 84a are operated by the index finger and the middle finger, respectively, of the user's right hand; the upper button 83b and the lower button 84b are operated by the index finger and the middle finger, respectively, of the user's left hand. As shown, the light-emitting block 85, located between the row of the right-side upper button 83a and lower button 84a and the row of the left-side upper button 83b and lower-button 84b, is not hidden by the index and middle fingers operating the buttons. This allows the camera 7 to take a suitable image of the light-emitting block 85 being lighted. The upper buttons 83 may be formed as pushbuttons, and the lower-buttons 84 may be provided as rotatably supported trigger buttons.

Figure 3:
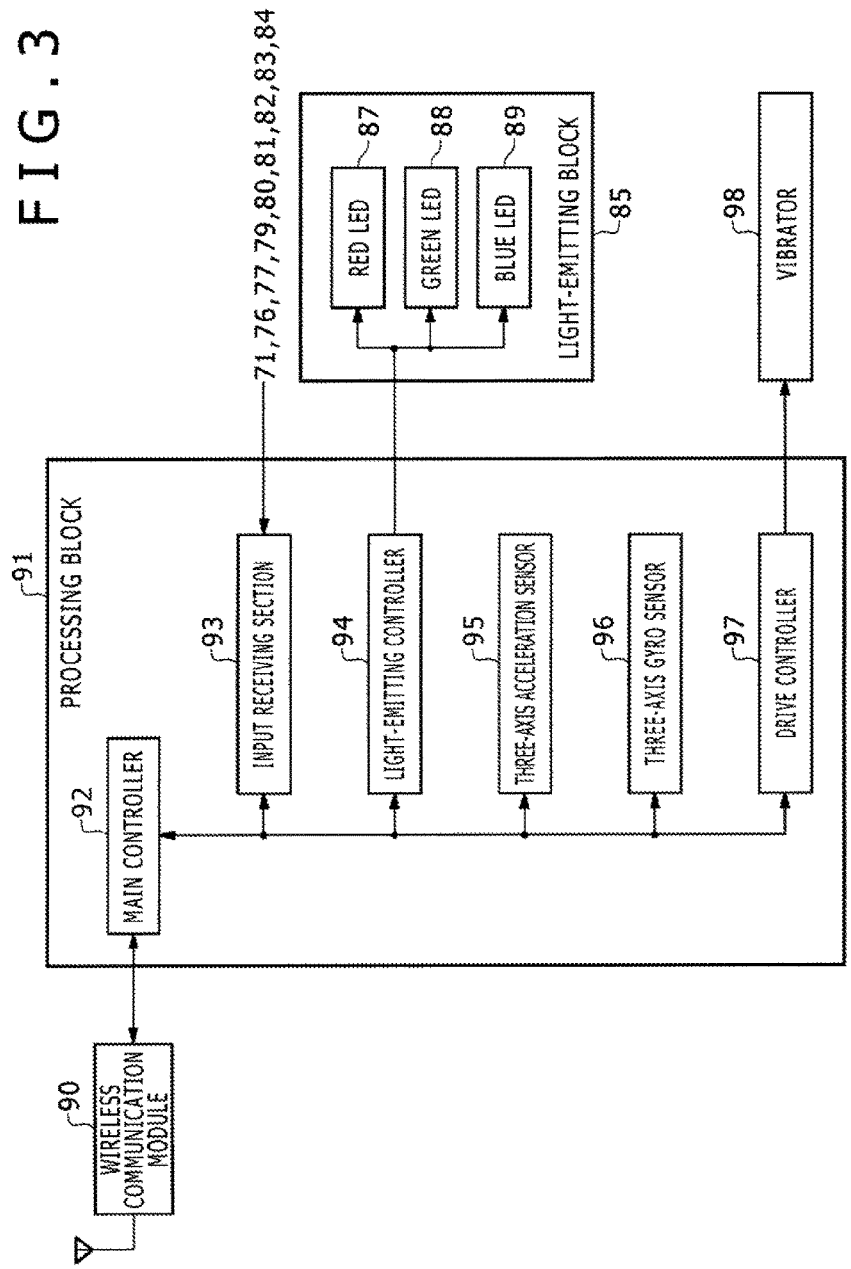
FIG. 3 is a diagram illustrating an internal configuration of the input device.

FIG. 3 shows an internal configuration of the input device 6. The input device 6 has a wireless communication module 90, a processing block 91, a light-emitting block 85, and a vibrator 98. The wireless communication module 90 has the function of transmitting and receiving data to and from a wireless communication module of the information processing apparatus 10. The processing block 91 performs predetermined processes in the input device 6.

The processing block 91 has a main controller 92, an input receiving section 93, a light-emitting controller 94, a three-axis acceleration sensor 95, a three-axis gyro sensor 96, and a drive controller 97. The main controller 93 transmits and receives necessary data to and from the wireless communication module 90.

The input receiving section 93 receives input information from the input sections made up of the direction keys 71, operation buttons 76, analog sticks 77, touch pad 79, function button 80, SHARE button 81, OPTION button 82, upper buttons 83, and lower buttons 84, and transmits the received input information to the main controller 92. The main controller 92 converts the received input information to predetermined control signals as required and supplies the resulting control signals to the wireless communication module 90. The wireless communication module 90 transmits the control signals to the information processing apparatus 10 at a suitable timing. The light-emitting controller 94 controls light emission of the red LED 87, green LED 88, and blue LED 89 that make up the light-emitting block 85.

In the information processing system 1 of this embodiment, the user pressing the function button 80 with the input device 6 and the information processing apparatus 10 powered off turns on the input device 6. This causes the main controller 92 to generate a connection request for connection with the information processing apparatus 10, the connection request being transmitted to the information processing apparatus 10 through the wireless communication module 90. The wireless communication module of the information processing apparatus 10 is in an active state even when the main power is off. Upon receipt of the connection request, the information processing apparatus 10 turns on the main power to start up the OS (system software), thereby establishing wireless communication with the input device 6. The system software of the information processing apparatus 10 determines the luminescent color for the light-emitting block 85 of the input device 6 that has transmitted the connection request, and transmits the luminescent color information to the input device 6. At this moment, it is preferable that the system software analyze information about the colors included in the space imaged by the camera 7 and identify a color that is as different from the environmental colors as possible, before determining the luminescent color of the light-emitting block 85. Thereafter, with the light-emitting block 85 lighted, it is possible suitably to detect the light-emitting block 85 lighted in the specified color, from the images captured by the camera 7.

The luminescent color information received by the wireless communication module 90 is passed on to the main controller 92. The main controller 92 notifies the light-emitting controller 94 of the luminescent color information. This allows the light-emitting controller 94 to make the light-emitting block 85 emit light in the specified color.

The vibrator 98 is configured to include an eccentric motor, for example, and is driven by the drive controller 97. The three-axis acceleration sensor 95 detects acceleration components in three-axis directions (X, Y, Z) of the input device 6. The three-axis gyro sensor 96 detects angular speeds on an XZ plane, a ZY plane, and a YX plane of the input device 6.

Figure 4:
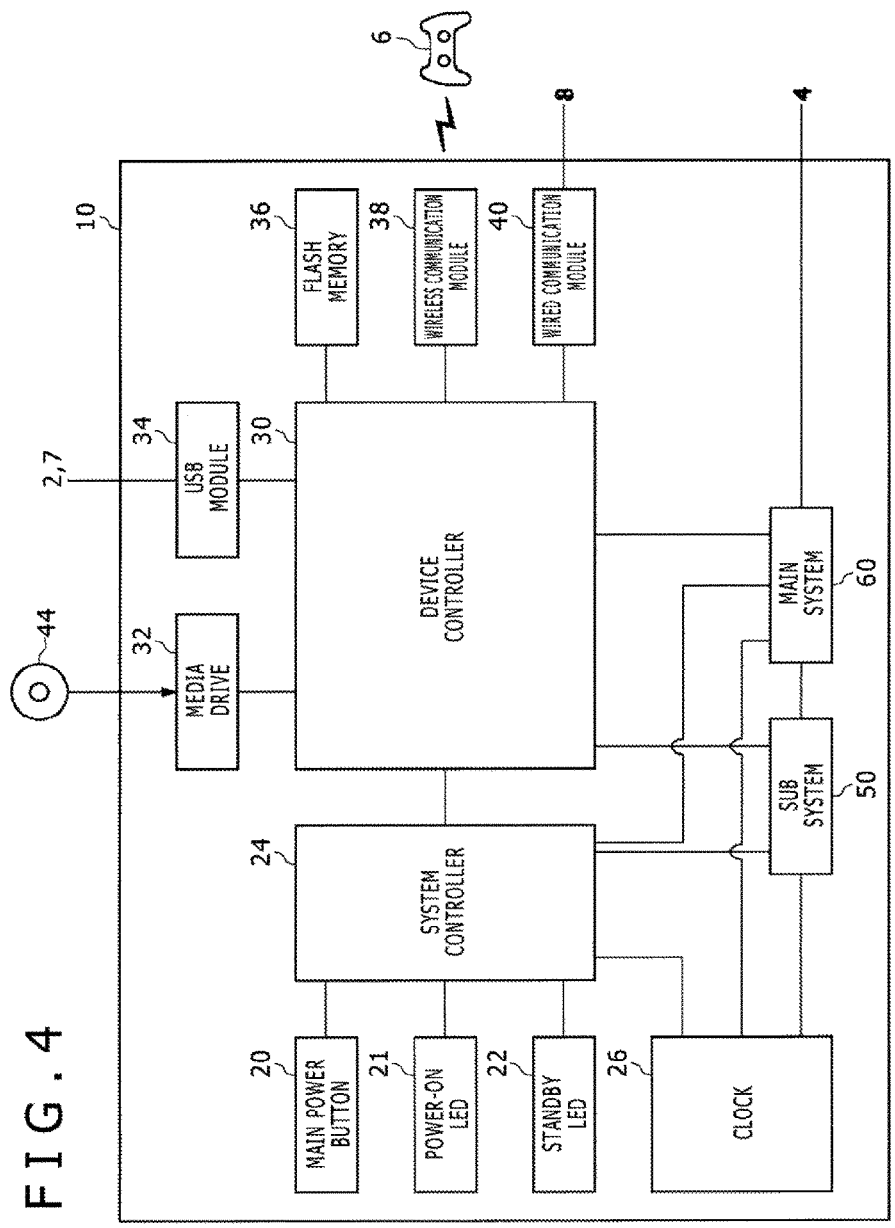
FIG. 4 is a diagram illustrating functional blocks of an information processing apparatus.

FIG. 4 is a functional block diagram of the information processing apparatus 10. The information processing apparatus 10 is configured to have a main power button 20, a power-on LED 21, a standby LED 22, a system controller 24, a clock 26, a device controller 30, a media drive 32, a USB module 34, a flash memory 36, a wireless communication module 38, a wired communication module 40, a sub system 50, and a main system 60.

The main system 60 is configured to have a main CPU (Central Processing Unit), and the sub system 50 is configured to have a sub CPU. The main CPU and the sub CPU operate in exclusive relation to each other. That is, while the main CPU has been started up and is in an active state, the sub CPU is in a standby state; while the sub CPU has been started up and is in an active state, the main CPU is in a standby state. The main power button 20 is an input section on which the user performs operation input. Located on the housing front of the information processing apparatus 10, the main power button 20 is operated to turn on and off power to the main system 60 of the information processing apparatus 10. That the main power is on denotes that the main system 60 is in an active state; that the main power is off denotes that the main system 60 is in a standby state. The power-on LED 21 is lighted when the main power button 20 is turned on; the standby LED 22 is lighted when the main power button 20 is turned off.

The system controller 24 detects the pressing of the main power button 20 by the user. When the main power button 20 is pressed with the main power being off, the system controller 24 acquires the pressing operation as an "on-instruction"; when the main power button 20 is pressed with the main power being on, the system controller 24 acquires this pressing operation as an "off-instruction." As described above, the ON/OFF of the main power may be controlled from the input device 6. When the function button 80 of the input device 6 is pressed with the main power being off, the system controller 24 acquires the button operation as an "on-instruction."

Upon receiving the on-instruction, the system controller 24 notifies the sub system 50 in an active state of the result of detection and lights the power-on LED 21 while turning off the standby LED 22. At this moment, the sub system 50 starts up the main system 60 and enters standby mode. On the other hand, upon receiving an off-instruction, the system controller 24 notifies the main system 60 in an active state of the detection result and lights the standby LED 22 while turning off the power-on LED 21. At this moment, the main system 60 starts up the sub system 50 and enters standby mode. The clock 26 is a real-time clock that generates current date and time information and supplies the generated information to the system controller 24, sub system 50, and main system 60.

The device controller 30 is configured as an LSI (Large-Scale Integrated Circuit) such as a southbridge that executes exchanges of information between devices. As shown, the device controller 30 is connected with devices such as the system controller 24, media drive 32, USB module 34, flash memory 36, wireless communication module 38, wired communication module 40, sub system 50, and main system 60. The device controller 30 absorbs differences in electric characteristics and transfer speeds between devices, thereby controlling the timing of data transfers.

The media drive 32 is a drive device that drives a loaded ROM medium 44 on which application software such as games is recorded, to read programs and data from the loaded ROM medium 44. The ROM medium 44 is a read-only recording medium such as an optical disk, a magneto-optical disk, or a Blu-ray disk.

The USB module 34 is a module that is connected to external devices via USB cables. For example, the USB module 34 may be connected to the auxiliary storage apparatus 2 that is a hard disk drive via a USB cable. The USB module 34 may be further connected to the camera 7 via a USB cable. The flash memory 36 is an auxiliary storage device that provides internal storage. The wireless communication module 38 communicates wirelessly with the input device 6, for example, under communication protocol such as Bluetooth (registered trademark) or IEEE 802.11. The wireless communication module 38 may comply with the third-generation digital mobile phone system based on the IMT-2000 (International Mobile Telecommunication 2000) standard stipulated by the ITU (International Telecommunication Union). The wireless communication module 38 may further comply with a higher-generation digital mobile phone system. The wired communication module 40 communicates with external devices in a wired manner and is connected to the network 3 via the AP 8 for example.

The main system 60 includes the main CPU, a memory acting as a main storage device, a memory controller, and a GPU (Graphics Processing Unit). These functions may be implemented by a single chip in the form of a system-on-a-chip. The main CPU has the function of starting up the OS and executing applications installed in the auxiliary storage device 2 in the environment provided by the OS.

Figure 5:
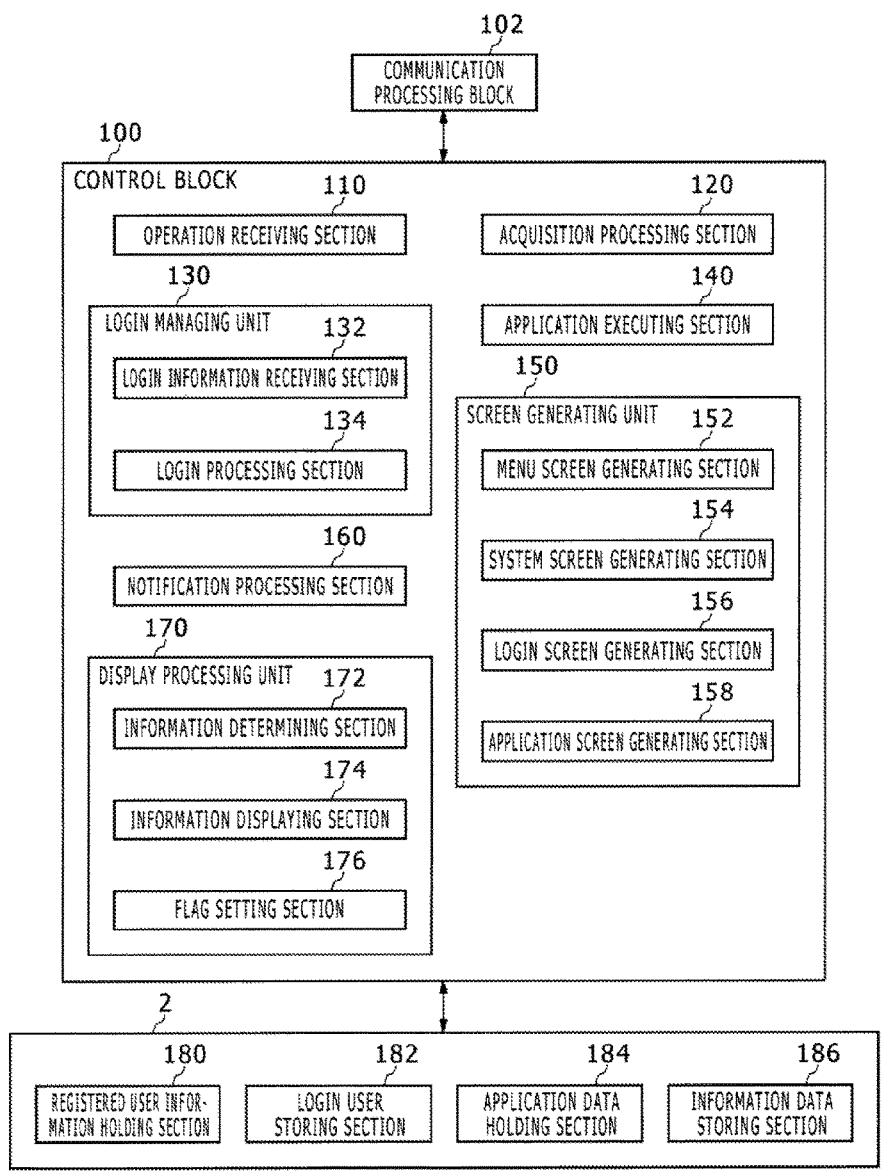
FIG. 5 is a diagram illustrating an internal configuration of the information processing apparatus.

FIG. 5 shows an internal configuration of the information processing apparatus 10. The information processing apparatus 10 has a communication processing block 102 and a control block 100. The control block 100 has an operation receiving section 110, an acquisition processing section 120, a login managing unit 130, an application executing section 140, a screen generating unit 150, a notification processing section 160, and a display processing unit 170. The communication processing block 102 is indicative of the functions of the wireless communication module 38 and wired communication module 40 shown in FIG. 4.

The elements shown in FIG. 5 as the functional blocks for performing diverse processes may be implemented by hardware such as circuit blocks, memories and LSIs, or by software such as programs loaded into memory. It is to be understood by those skilled in the art that these functional blocks may be implemented by hardware alone, by software alone, or by a combination of hardware and software in diverse forms that are not limitative of the implementations of the present invention.

To log in to the information processing apparatus 10, the user needs to register a login account and a login passcode with a registered user information holding section 180. In the registered user information holding section 180, the user's login account, login passcode, network account, sign-in ID, sign-in passcode, online ID, and icon image are associated with one another as registered user information and registered as such. The network account, sign-in ID, and sign-in passcode are the user information needed by the user to sign in to the service provided by the management server 15. The user's online ID is his/her nickname on the network. The user's icon image is an image representing the user. The icon image may be the user's portrait photo or some other picture.

In the information processing system 1 of this embodiment, the user logs in to the information processing apparatus 10 and signs in to the network service provided by the management server 15. As described above, the information processing apparatus 10 has the main system 60 and the sub system 50, one of which is in an active state. In the information processing apparatus 10, either the main system 60 or the sub system 50 maintains the state of connection with the server 5 so that even when the user logs out of the information processing apparatus 10, the state of sign-in to the network service is maintained. After the user has logged out, the main system 60 kept in an active state remains communicable with the server 5 and maintains the sign-in state. When the main power of the information processing apparatus 10 is turned off, the sub system 50 remains communicable with the server 5 and maintains the user's sign-in state.

In the information processing system 1 of this embodiment, once the user signs in to the network service, the sign-in state is thus maintained regardless of the user having logged in to or having logged out of the information processing apparatus 10. The sign-in state being maintained allows the information processing apparatus 10 to offer the user such advantages as downloading of content from the management server 15 whenever desired or acquisition of messages from other users.

With the user having logged out of the information processing apparatus 10, pressing the function button 80 of the input device 6 causes the wireless communication module 90 to transmit the pressing information to the information processing apparatus 10. In the information processing apparatus 10, the communication processing block 102 receives the pressing information from the function button 80 as the connection request and establishes connection accordingly with the communication processing block 102 and the wireless communication module 90. The pressing information from the function button 80 is also transmitted to the control block 100.

A login screen generating section 156 reads the registered user information held in the registered user information holding section 180 to generate a selection screen for selecting the users registered with the information processing apparatus 10. At this moment, the login screen generating section 156 reads the online IDs and icon images out of the registered user information to generate a selection screen that lists the online IDs and icon images of the registered users.

Figure 6:
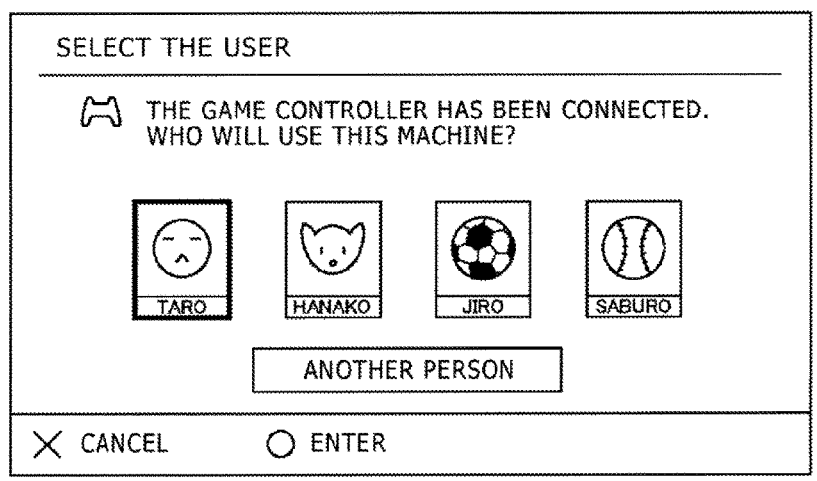
FIG. 6 is a diagram illustrating a user selection screen.

FIG. 6 shows a typical user selection screen. On the user selection screen, the user information including the online IDs and icon images is arranged in selectable fashion. The login screen generating section 156 may arrange the user information in chronological order of the users' last login times (or last log-off times), most recent first. In the example shown in FIG. 6, an online ID "TARO" appears in the leftmost position (reference position), followed by online IDs "HANAKO," "JIRO" and "SABURO," in that order to the right. This means that the last login times of the online IDs "TARO," "HANAKO," "JIRO" and "SABURO" are close to the present time in that order.

On the user selection screen, the login screen generating section 156 displays a focus frame enclosing the user information of one user in a manner movable over the list. By operating the direction keys 71 of the input device 6, the user moves the focus frame onto the display region of his/her user information. Pressing the enter key (circle button 72) on the input device 6 allows the user to select his/her user information. Suppose now that the user A requesting a login is selecting "TARO" on the selection screen by operating the input device 6a. In this case, the login screen generating section 156 generates a passcode input screen shown in FIG. 7(*a*). By operating the input keys of the input device 6a, the user A inputs his/her passcode that is a combination of four input keys.

FIG. 7(*b*) shows the state in effect after the user has input the passcode. A login information receiving section 132 receives the passcode input by the user A for login authentication. A login processing section 134 performs login authentication using the passcode received by the login information receiving section 132. Specifically, the login processing section 134 determines whether the passcode received by the login information receiving section 132 is the same as the passcode held in the registered user information holding section 180. If the passcode input by the user A turns out to be the same as the passcode of the user A registered in the registered user information holding section 180, the login processing section 134 determines that the input login passcode is correct and allows the user A to log in to the information processing apparatus 10. At this moment, the login processing section 134 generates luminescent color information specifying a predetermined color for the input device 6a, with the communication processing block 102 transmitting the luminescent color information to the input device 6a. In response, the input device 6a lights the light-emitting block 85 in the color specified by the luminescent color information. The login processing section 134 stores into a login user storing section 182 the login information, i.e., the information identifying the user A (user account), the information identifying the input device 6a used by the user A (game controller ID), and the luminescent color information in association with one another.

By having the login information stored into the login user storing section 182 as described above, the login managing unit 130 manages the users logging in to the OS of the information processing apparatus 10. When the user A logs in to the information processing apparatus 10, a menu screen generating section 152 generates a menu screen for the user A and displays the generated menu screen on the output device 4.

Figure 8:
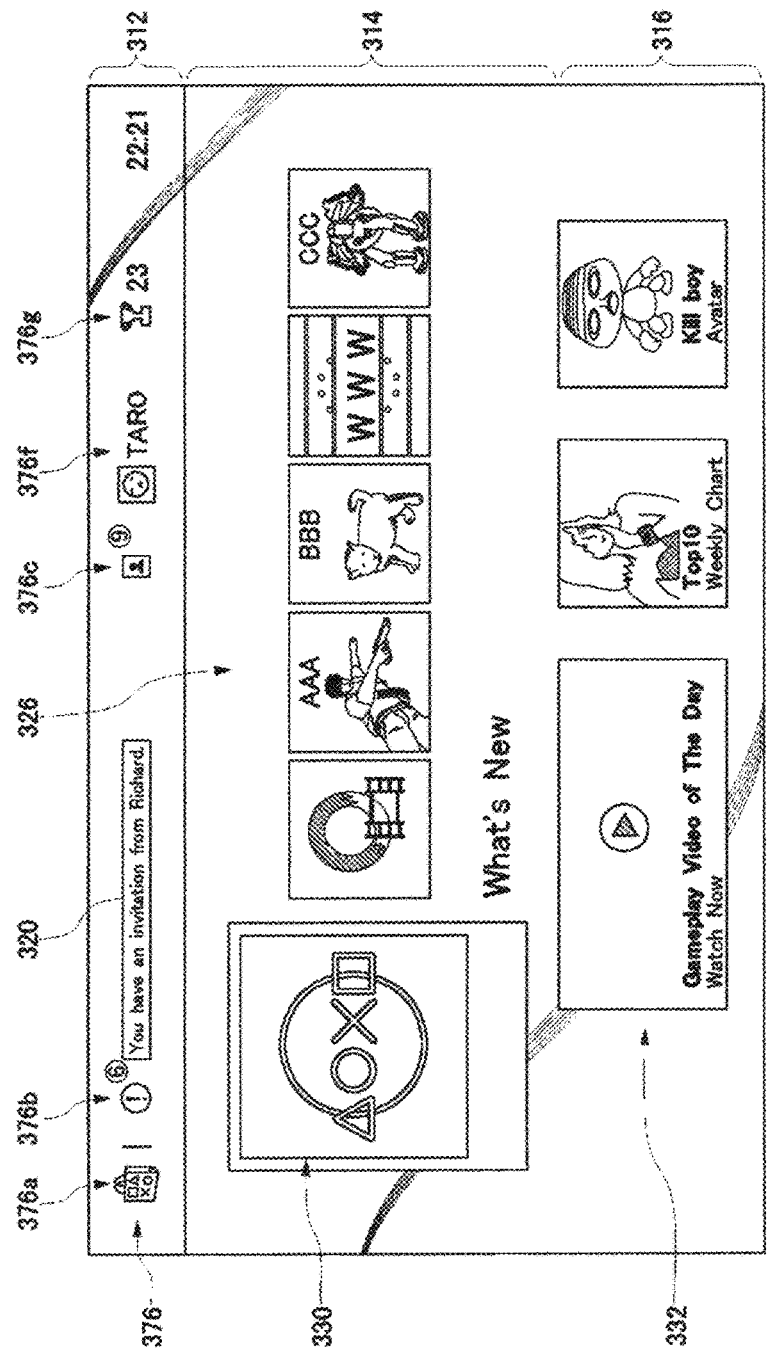
FIG. 8 is a diagram illustrating a typical menu screen.

FIG. 8 shows a typical menu screen. The menu screen generating section 152 positions a newly arriving information icon 330 at the head of an icon row (i.e., at the leftmost position). When initially displaying the menu screen, the menu screen generating section 152 puts the newly arriving information icon 330 in a focused state in a content area 314. The menu screen generating section 152 references the dates and times of the users' access to the applications and contents, and arranges content icons 326 on the second and subsequent rows in chronological order of the access, most recent first. When the newly arriving information icon 330 is placed in the focused state, the menu screen generating section 152 positions live information items 332 in a live area 316.

Furthermore, the menu screen generating section 152 positions in a system area 312 some of multiple system function icons 376 indicating the multiple system functions provided by the information processing apparatus 10. In the example of FIG. 8, a store icon 376a, a notification icon 376b, a friend icon 376c, a profile icon 376f, and a trophy icon 376g are displayed. A trophy count indicator indicating the number of trophies acquired by the user ("23" in FIG. 8) is shown associated with the trophy icon 376g.

The menu screen generating section 152 positions an online count indicator indicating the number of friends ("9" in FIG. 8) currently logging in to other information processing apparatuses 14, in association with the friend icon 376c. In the information processing system 1, the friend users are the users registered with the management server 15 as the friends of the user A.

To register a friend requires that the user A transmit a friend request addressed to a specific user and that the addressed user approve of becoming a friend of the user A. Conversely, the user A may approve a friend request from a given user, thereby registering the friend with the management server 15. In this manner, the management server 15 has friends registered for each user. Basically, the user is always in a state of signing in to the network service. When a user logs in, the information processing apparatus 10 or 14 notifies the management server 15 of the user's login information. The management server 15 is thus able to manage which of the users having made sign-in registrations are logging in to the information processing apparatuses.

The menu screen generating section 152 positions an unread count indicator indicating the number of information items ("6" in FIG. 8) not read by the user, in association with the notification icon 376b. The information includes messages transmitted to the user A from the management server 15 and messages generated by the system software of the information processing apparatus 10. The unread information refers to the information yet to be read by the user. The menu screen generating section 152 forms near the notification icon 376b a display area 320 for displaying the information addressed to the user A.

Explained below with reference to FIG. 1 is the process of displaying information in the display area 320.

Suppose that the user D is playing a game using the information processing apparatus 14, the game being playable by one or more other users. If the user D desires to play the game with the user A, the user D may invite the user A to a game session via the management server 15.

Specific steps of invitation are as follows: The user D of the information processing apparatus 14 first notifies the management server 15 that the user A is being invited. Upon receipt of the notification from the user D, the management server 15 generates information data including an invitation message addressed to the user A, and notifies the push server 17 that there is an invitation message addressed to the user A. In response, the push server 17 gives push notification to the information processing apparatus 10 of the user A, saying that the information data addressed to the user A is stored on the management server 15. Upon receipt of the push notification, the information processing apparatus 10 gains access to the management server 15 to acquire the information data including the invitation message. The acquisition processing section 120 acquires diverse information data from the management server 15 and from the system software of the information processing apparatus 10. Explained below are some categories of the information which is addressed to the user A and of which the notification is made from the management server 15 and from the system software.

(a) Ordinary Messages

Ordinary messages are generated by other users and include a friend request message, for example. Some other user may generate a message addressed to the user A at a desired timing. The information processing apparatus 14 transmits the generated message to the information processing apparatus 10 via the management server 15.

(b) Invitation Messages

Invitation messages are generated by the management server 15. When another user D invites the user A to the game session being played, the management server 15 generates an invitation message on the basis of the invitation request from the information processing apparatus 14 and transmits the generated invitation message to the information processing apparatus 10. Alternatively, the invitation message may be generated by the information processing apparatus 14 before being transferred to the information processing apparatus 10 via the management server 15.

It might happen that some other user D has sent an invitation message to the user A but has since changed his/her mind or now intends to end the game play. In such a case, the information processing apparatus 14 of the user D transmits to the management server 15 an invitation cancel request to cancel the invitation. In turn, the management server 15 generates an invitation cancel message and transmits the generated message to the information processing apparatus 10. Alternatively, when the user D terminates the game play, the management server 15 detecting the end of the play may automatically generate an invitation cancel message and transmit the generated message to the information processing apparatus 10.

(c) Offer Messages

Offer messages are generated by other users and may each include game item data, for example. The offer message may be generated by another user offering an in-game item as a present. The offer message may also be generated by the management server 15 as a message announcing newly arriving information about games, for example. If the management server 15 is constituted by multiple functional servers, the game server among them may generate offer messages.

Explained above were typical categories of the information (messages) transmitted to the user A from the management server 15. In the information processing apparatus 10, there also exists information generated by the system software.

(d) Download Messages

A download message is generated by the system software of the information processing apparatus 10. This is a message announcing that the download by the information processing apparatus 10 of application data, for example, has been completed.

(e) Upload Messages

An upload message is generated by the system software of the information processing apparatus 10. This is a message announcing that the upload by the information processing apparatus 10 of a captured image, for example, has been completed.

Alternatively, the download and upload messages may be generated by the management server 15. In this case, the information processing apparatus 10 notifies the management server 15 that download or upload has been completed. In turn, the management server 15 generates a download message or an upload message and transmits the generated message to the information processing apparatus 10.

In the information processing apparatus 10, the acquisition processing section 120 acquires diverse information data (messages) from the management server 15 or from the system software of the apparatus 10. The diverse items of information data are each provided with a type ID identifying the type of the information. The type IDs may be assigned to the above-mentioned five categories. Each message category may be further subdivided into more categories. In the information processing apparatus 10 receiving information data, the type IDs are preferably subdivided for use in identifying the information data being classified.

The acquisition processing section 120 stores into an information data storing section 186 the information data which is addressed to the user A and which has been acquired from the management server 15 and from the system software, the information data being stored in association with time information indicative of the dates and times at which the information data was acquired. The information data includes type IDs that allow the display processing unit 170 to distinguish the information data stored in the information data storing section 186 with reference to the type IDs. Alternatively, the acquisition processing section 120 may generate a folder for each of the type IDs of information data and store the information data into the folders in the information data storing section 186.

In the information data storing section 186, a read/unread flag is set to each of the items of information data. When storing an item of information data, the acquisition processing section 120 sets an unread flag in association with the stored data item. The unread flag indicates that the user A has yet to read the message (i.e., the message has yet to be displayed); the read message indicates that the user A has read the message once (i.e., the message is displayed once). When the user A has read the message, a flag setting section 176 changes the unread flag to the read flag.

As discussed above, when the acquisition processing section 120 acquires information data including an invitation message, the user A is able to take part in the game session of the user D. On the other hand, when the acquisition processing section 120 acquires information data including an invitation cancel message, that means the invitation from the user D is cancelled. That is, the invitation by the invitation message remains valid until an invitation cancel message is received. Once an invitation cancel message is received, the invitation is invalidated. The information data storing section 186 thus sets a valid/invalid flag to each invitation message. The acquisition processing section 120 sets a valid flag to each invitation message getting stored. The valid flag indicates that the invitation to the user A is valid, and the invalid flag indicates that the invention has been invalidated. When the acquisition processing section 120 acquires information data including an invitation cancel message, the flag setting section 176 changes the valid flag to the invalid flag.

The display processing unit 170 displays the information addressed to the user on the output device 4 by use of the information data stored in the information data storing section 186. In the display processing unit 170, an information determining section 172 determines the information to be displayed in accordance with predetermined priorities. An information displaying section 174 displays multiple items of information addressed to the user A in a predetermined display area on the output device 4. Referring to FIG. 8, the information displaying section 174 scrolls multiple items of information addressed to the user A and displayed in the display area 320 within the system area 312. Scrolling display, also called marquee display, is a technique by which a character string is displayed in a manner flowing in a predetermined direction.

The information determining section 172 determines the order of the information to be displayed in the display area 320 in accordance with the priorities explained below.
(First Priority)

Of the message categories, that of invitation messages is set for the information to be displayed with the highest priority. The invitation message, which invites the user A to a game session or to some other application session, needs to be responded to by the user A as soon as possible. The information determining section 172 thus determines the invitation messages as the information to be displayed with the highest priority. The information displaying section 174 scrolls in the display area 320 the invitation messages being displayed as the first display information. This allows the user, when opening the menu screen, first to recognize the arriving invitation messages and to respond thereto immediately.

Although the category of invitation messages is given the highest priority among the multiple message categories, the need to have the read and/or invalid invitation messages displayed and scrolled in the display area 320 is not quite as high. It is thus preferred that the information determining section 172 determine the valid and unread invitation messages as the information to be displayed preferentially.

The information determining section 172 determines whether invitation messages are valid, invalid, read, or unread by referencing the valid/invalid flag and the read/unread flag set to each invitation message. After identifying the valid and unread invitation messages in the information data storing section 186, the information determining section 172 sequences these messages for display in descending order of their time information, most recent first. This allows the latest valid and unread invitation messages to be displayed in descending order in the display area 320. The display prompts the user A to recognize the latest invitation messages without delay and to know their presence with efficiency.

The information determining section 172 determines the information to be displayed within a maximum allowable number of information items. For example, the information determining section 172 sets to 20 the maximum allowable number of information items that may be displayed in the display area 320. The information displaying section 174 scrolls the displayed information items at predetermined intervals (e.g., at intervals of 5 seconds).
(Second Priority)

If the number of valid and unread invitation messages is smaller than the maximum allowable number, the information determining section 172 determines the unread messages of the other categories as the information to be displayed. That is, if the number of valid and unread invitation messages is smaller than 20, the information determining section 172 identifies the unread messages from among the messages of the other categories, specifically the above-mentioned ordinary messages, offer messages, download messages, and upload messages. The information determining section 172 proceeds to determine the display priorities of the identified messages in descending chronological order, most recent first. These messages are displayed in the determined order after all valid and unread invitation messages have been displayed. When the messages of the categories other than that of invitation messages are thus displayed and scrolled as the second-highest priority messages, the user A is able to know the most recent messages that have arrived.

When the information determining section 172 determines the unread messages as the information to be displayed, the information displaying section 174 may display a mark indicative of the presence of the unread messages in a manner superimposed on or close to the notification icon 376b. This mark may include the unread count indicator shown in FIG. 8. The mark allows the user to become aware of the presence of the unread messages without reading the information displayed and scrolled in the display area 320. Alternatively, the presence of the unread messages may be announced by the notification icon 376b being highlighted. In any case, it is preferred that the user A be able to verify easily the presence of unread messages according to the manner in which the notification icon 376b itself or an indicator nearby is displayed differently.

Figure 9:
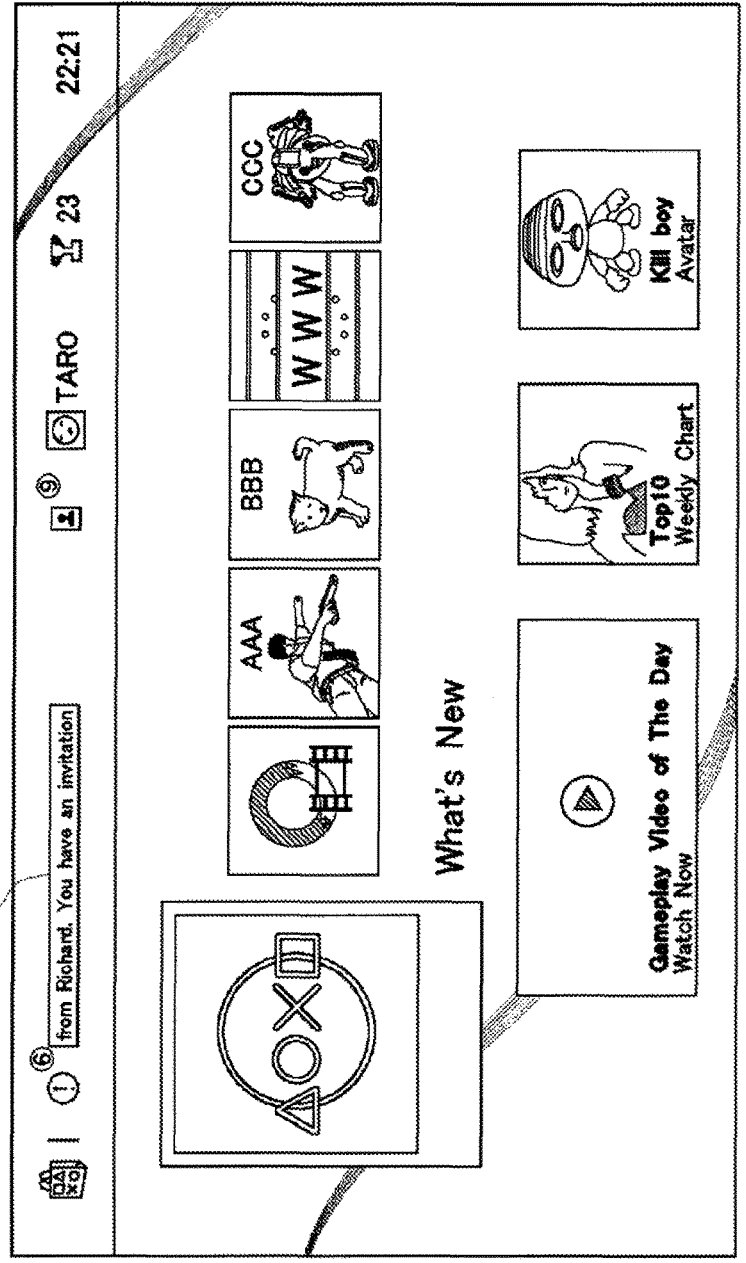
FIG. 9 is a diagram illustrating another typical menu screen.

FIG. 9 shows another typical menu screen. In the display area 320, the information displaying section 174 displays and scrolls information in the order determined by the information determining section 172. The information displaying section 174 may scroll multiple items of information from right to left in the display area 320, thereby presenting the user with the information efficiently despite limited space.

When the user selects the notification icon 376b on the menu screen shown in FIG. 8 or 9, the system screen generating section 154 generates a system screen.

Figure 10:
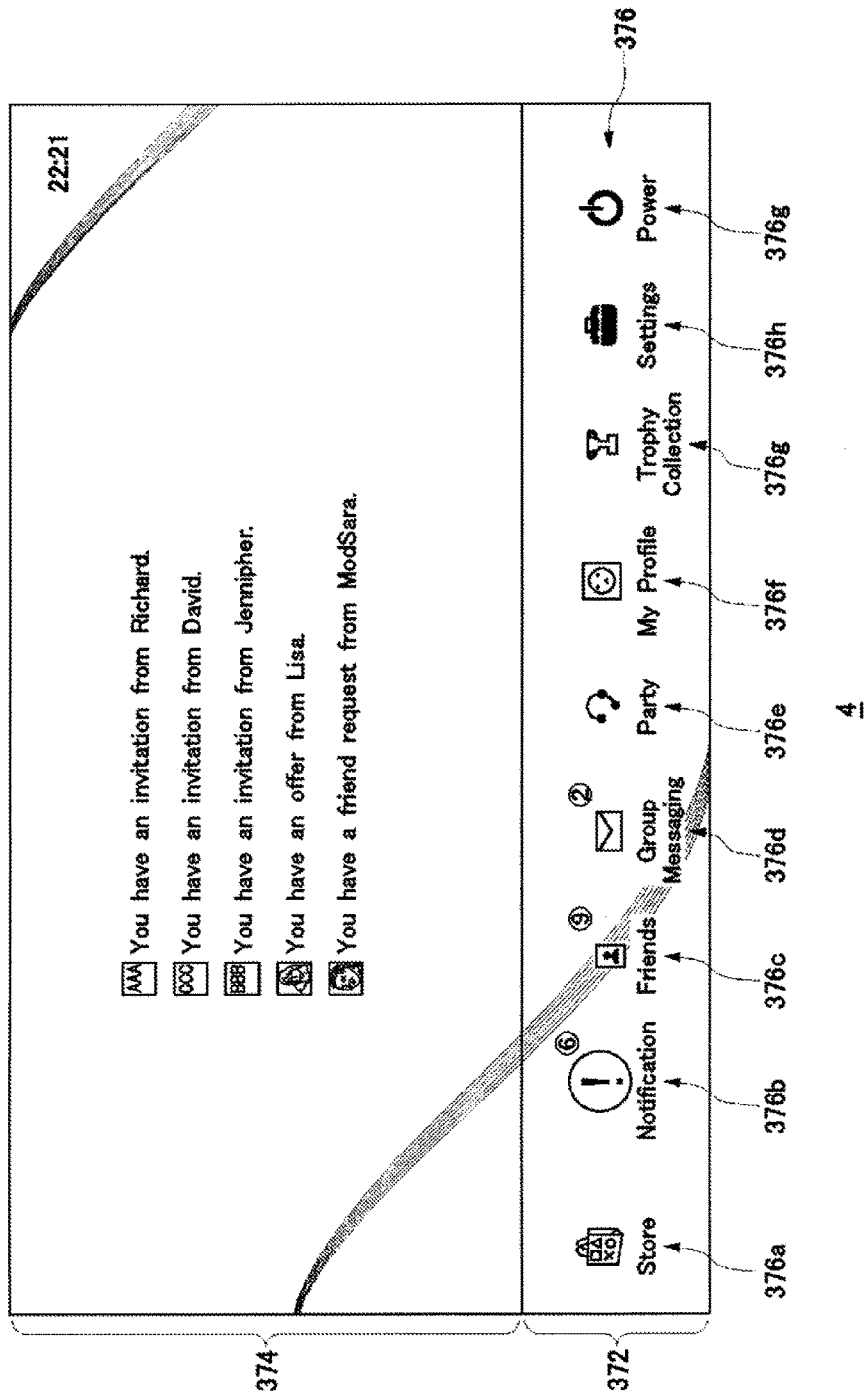
FIG. 10 is a diagram illustrating a typical system screen having transitioned from an initial menu screen.

FIG. 10 shows a typical system screen having transitioned from the initial menu screen. On the menu screen of FIG. 8 or 9, the user may select and determine on the notification icon 376b. In this case, the operation receiving section 110 receives the determination operation and forwards it to the system screen generating section 154. In turn, the system screen generating section 154 displays on the output device 4 the system screen shown in FIG. 10.

In a system function selection area 372, the system screen generating section 154 arranges multiple system function icons 376 in a row. Displayed in this example are a store icon 376*a*, a notification icon 376*b*, a friend icon 376*c*, a group message icon 376*d*, a party icon 376*e*, a profile icon 376*f*, a trophy icon 376*g*, a setting icon 376*h*, and a power icon 376*i*. In accordance with the user's crosswise operation input to the input device 6, the display processing unit 170 switches focus from one system function icon 376 to another and displays the focused icon in highlighted fashion (e.g., of larger size, in different color). In FIG. 10, the notification icon 376*b* is shown selected, focused, and highlighted from among the other icons.

In a preview area 374, the messages with their order of display determined by the information determining section 172 are displayed by the information displaying section 174 in the determined order from the top down. In the preview area 374, the number of information items allowed to be displayed is limited to five. The information determining section 172 thus determines the top-priority five messages in accordance with the above-described priorities. The information displaying section 174 displays the determined top-priority five messages in the preview area 374.

The information determining section 172 determines the information to be displayed in accordance with the conditions defined by the highest and the second-highest priorities. In determining the information to be displayed in the preview area 374, the information determining section 172 may further utilize the third-highest priority.

(Third Priority)

It might happen that the number of valid and unread messages plus the number of unread messages of the categories different from that of invitation messages are smaller than the maximum allowable number (5). In that case, the information determining section 172 determines read messages as further information to be displayed. Although it is not very necessary to display in the display area 320 the messages already read by the user, these messages when additionally listed in the preview area still allow the user to verify the most recently received messages.

In the example of FIG. 10, the top-priority three messages are valid and unread invitation messages sent to the user A from Richard, David and Jennipher, respectively, followed by an unread offer message from Lisa in the fourth-highest position and an unread friend request message from Mod-Sara in the fifth-highest position. As described, where there are five or more unread messages, the preview area 374 displays information indicative of the presence of unread messages. Where there are four or fewer unread messages, the information determining section 172 determines the most recent read messages as further information to be displayed in accordance with the third-highest priority.

On the system screen shown in FIG. 10, the user may focus and determine on the notification icon 376*b*. This causes the operation receiving section 110 to receive the determination operation and forward it to the system screen generating section 154. In turn, the system screen generating section 154 displays a lower-layer system screen on the output device 4.

Figure 11:
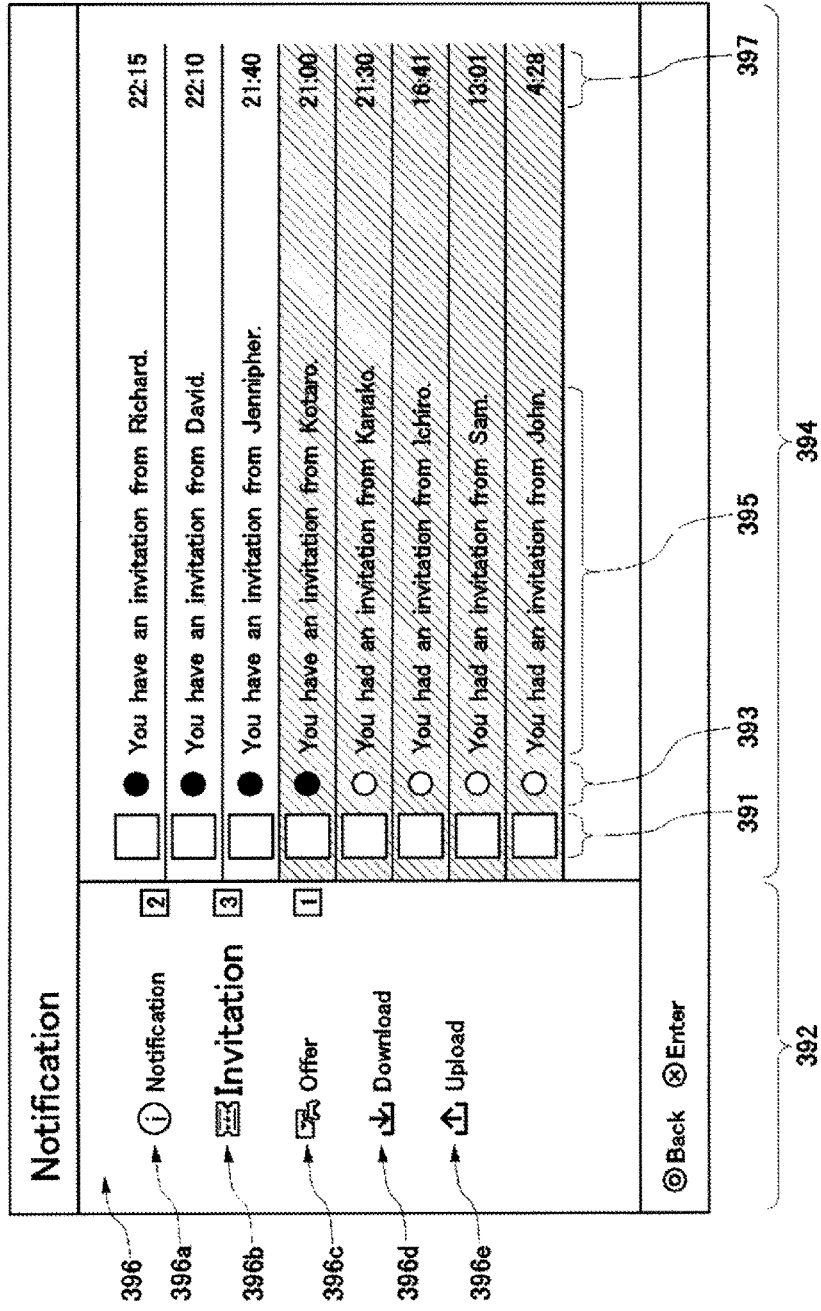
FIG. 11 is a diagram illustrating a system screen for viewing information.

FIG. 11 shows a system screen for viewing information. The system screen generating section 154 displays the system screen for viewing information (messages) by category on the output device 4. The system screen generating section 154 arranges in a category selection area 392 multiple category tabs 396 indicative of the multiple categories of the information (messages) data acquired by the acquisition processing section 120. The category tabs 396 include an ordinary message tab 396*a*, an invitation message tab 396*b*, an offer message tab 396*c*, a download message tab 396*d*, and an upload message tab 396*e*. As shown in FIG. 11, on the system screen for viewing information, multiple messages are displayed not in mingled fashion by multiple categories but on a category-by-category basis. In other words, when a specific category is selected, only the information belonging to the selected category is displayed.

When the system screen for viewing information is initially displayed, i.e., when the user has yet to specify any category tab 396, the system screen generating section 154 autonomously selects and highlights the invitation message tab 396*b*. Upon initial display, the invitation messages transmitted to the user A from other users are thus displayed in list form in a notification list area 394. The notification list area 394 is divided crosswise into a thumbnail area 391, a valid/invalid display area 393, a message display area 395, and a time display area 397.

As mentioned above, the invitation messages stored in the information data storing section 186 are associated with the time information indicative of the dates and times at which the messages were acquired, read/unread flags, and valid/invalid flags. The read/unread flag indicates whether the invitation message carrying it has yet to be read (i.e., has yet to be displayed) or is already read (displayed). The valid/invalid flag indicates whether the invitation message carrying it is valid (i.e., the user A is still invited) or invalid (the user A is no longer invited).

The information determining section 172 identifies invitation messages by referencing the type IDs of the information stored in the information data storing section 186. By use of the time information and valid/invalid flags associated with the invitation messages identified, the information determining section 172 determines the priorities by which the messages are to be displayed in the notification list area 394. The higher the display priority, the higher the position where the invitation message is displayed in the message display area 395. In this embodiment, multiple invitation messages are arranged from the top down according to their display priorities. Alternatively, the messages may be displayed from left to right, for example. In any case, the invitation messages are displayed by the information displaying section 174 in a manner starting from the display position for the highest-priority invitation message (i.e., reference position) and arranged in a predetermined direction. The information determining section 172 determines display priorities according to multiple criteria explained below.

As a first criterion, the information determining section 172 makes the display priority of valid invitation messages higher than that of invalid invitation messages. In the message display area 395, the valid invitation messages are thus displayed always above the invalid invitation messages. Specifically, by referencing the valid/invalid flags of multiple invitation messages, the information determining section 172 classifies the messages set with the valid flags into a valid group and the messages set with the invalid flags into an invalid group.

As a second criterion, the information determining section 172 determines the display priorities of the invitation messages in descending chronological order of their time information, most recent first, within the valid group and also within the invalid group. That is, the closer the time information of the valid multiple invitation messages is to the present time, the higher their display priorities are determined to be by the information determining section 172. Likewise, the closer the time information of the invalid multiple invitation message is to the present time, the higher their display priorities are determined to be by the information determining section 172.

The information displaying section 174 displays the invitation messages from the top down in the message display area 395 according to their display priorities determined by the information determining section 172. At this moment, the information displaying section 174 displays in the thumbnail area 391 thumbnails corresponding to the invitation messages, i.e., thumbnail images of the games being played by the inviting users. This allows the user to know the games he/she is invited to.

The information displaying section 174 also displays in the valid/invalid display area 393 information indicating whether a given invitation is valid according to the valid/invalid flag. In the example of FIG. 11, the top-priority four invitation messages are each marked with a black circle, and the lower-priority four invitation messages are each marked with a white circle. In this example, the black circle mark indicates that the invitation is valid, and the white circle mark denotes that the invitation is invalid. The valid/invalid display area 393 may have other types of marks or may give representations in other forms indicative of whether the invitation is valid. For example, the message "You have an invitation from . . . ," which signifies that the invention is valid, may be displayed in a distinctive color or may be blinked to let the user A recognize that the invitation is valid. The message "You had an invitation from . . . ," which means that the invitation is invalid, may be displayed more discreetly so that the valid invitation messages may appear more distinctly in contrast. When the information displaying section 174 thus provides different forms of display between valid and invalid invitation messages, the user A is able to distinguish easily the valid invitation messages from the invalid ones.

The information displaying section 174 displays in the time display area 397 the times at which the information (messages) data was acquired. The time information associated with the messages is used here as the time display. According to the valid/invalid flag, the information displaying section 174 further displays read and unread messages in different forms. In this example, the unread messages are hatched when displayed; the lower-priority five messages are shown read already. When the information displaying section 174 thus provides different forms of display between read and unread invitation messages, the user A is able to distinguish easily the read invitation messages from the unread ones.

When the information displaying section 174 arranges valid invitation messages from the top down in the message display area 395, the user is able to find easily the presence of valid invitations. The names of the users acting as invitation hosts are displayed in the message display area 395, while the thumbnail images corresponding to the games being played by the invitation hosts are displayed in the thumbnail area 391. This allows the user A easily to recognize which user is playing which game.

When the acquisition processing section 120 acquires information data including an invitation cancel message from the management server 15, the flag setting section 176 changes the valid flag of the corresponding invitation message to the invalid flag. For example, if the acquisition processing section 120 acquires an invitation cancel message from Jennipher, the flag setting section 176 sets an invalid flag to the invitation message from Jennipher. As a result, the third message from the top in FIG. 11 is changed to "You had an invitation from Jennipher," with a white circle displayed in the valid/invalid display area 393. When set with the invalid flag, Jennipher's invitation message has its display position switched with the message from Kotaro currently in the fourth position from the top. If the user A does not select the message from Jennipher, the unread status of the message is maintained.

If the user A determines selectively on the valid invitation message from Richard displayed in the highest position, Richard's invitation screen is displayed. When the invitation message selectively determined on has its invitation screen displayed, the invitation message is assumed to have been read (i.e., displayed).

The valid invitation message is a message of which the details of invitation are displayed when the message is selectively determined on as described above, with accompanying display of the means for accepting the invitation (i.e., participation button). In contrast, the invalid invitation message is a message of which the details are displayed when the message is selectively determined on, without accompanying display of the means for accepting the invitation. On the system screen shown in FIG. 11, the invalid invitation messages are still displayed so that the user A may ascertain that he/she was invited. The screen displaying the invitation details also allows the user A to acquire information about the applications to which he/she was invited as well as information about how to purchase the applications.

Figure 12:
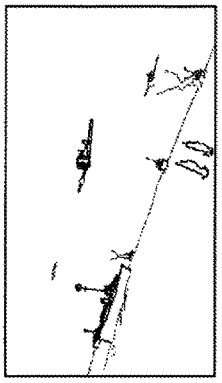
FIG. 12 is a diagram illustrating a typical invitation screen.

FIG. 12 shows a typical invitation screen. When the user A determines on the invitation message from Richard on the system screen shown in FIG. 11, the acquisition processing section 120 acquires information about the game play of Richard from the management server 15, and the system screen generating section 154 displays Richard's invitation screen on the output device 4. At this moment, the flag setting section 176 changes the unread flag associated with Richard's invitation message to the read flag. This leaves Richard's invitation message associated with the read flag. Thereafter, when the user A opens the system screen of FIG. 11, the invitation message from Richard is displayed hatched and thus shown read already.

The invitation screen displays information about the progress status of the game being played by Richard and about the user participating in the game session. A comment field 400 displays a comment if attached by Richard. When selectively determining on a participation button 402, the user A is able to participate in the game session being played by Richard acting as the host.

Explained next is another embodiment of this invention designed to present the user A with information efficiently.

On the menu screen shown in FIG. 8, the user A may selectively put a desired content icon 326 in a focused state and perform the operation to determine on that icon. In that case, the operation receiving section 110 receives the determination operation performed on the content icon 326. At this moment, the application executing section 140 reads the corresponding application data from an application data holding section 184 and executes the retrieved data. In this embodiment, the application data is a game program. The application executing section 140 starts up and executes the game. Explained below is the case in which a golf game playable by multiple users is executed.

Figure 13:
FIG. 13 is a diagram illustrating a typical game screen.

FIG. 13 shows a typical game screen. The application executing section 140 lets the game proceed by use of operation signals from the input device 6 received by the operation receiving section 110. An application screen generating section 158 generates the game screen and displays the generated screen on the output device 4. As mentioned above, multiple registered users are able to log in to the information processing apparatus 10. It is assumed here that as shown in FIG. 1, multiple users A, B and C log in and play the golf game together. In the golf game, a character representing each user hits a ball with a club to put the ball into each hole with the smallest number of strokes.

While the game is being played by such multiple login users, information (messages) data may be arriving addressed to the login users from another information processing apparatus 14 via the management server 15. The system software may also generate a download message or an upload message. In particular, upon arrival of an invitation message inviting any user to an online game, the invited user presumably wants to know as soon as possible that the invitation has arrived. It is also preferred that newly arriving information of some other category addressed to a given user be brought to the user's attention in a manner not disturbing the ongoing game play.

The acquisition processing section 120 acquires the information data addressed to the user from the management server 15 via the network 3 or from the system software. Using the information data, the notification processing section 160 gives notification of the information addressed to the user. Explained below is an example in which the user D (with online ID "Yamada") of the information processing apparatus 14 invites the user A (with online ID "TARO") of the information processing apparatus 10.

The user D of the information processing apparatus 14 is playing the game titled "AAA." The user D, who decides to invite the user A, a friend, to the game, uses the information processing apparatus 14 to notify the management server 15 that the user A is being invited. The management server 15 manages that the information processing apparatus 14 is generating the game session of the title "AAA." Given the notification from the information processing apparatus 14, the management server 15 generates information data addressed to the user A and notifies the push server 17 that there exists the information data addressed to the user A. In turn, the push server 17 gives push notification to the information processing apparatus 10, saying that there is the information data addressed to the user A. The acquisition processing section 120 acquires the information data addressed to the user A from the management server 15 via the network 3 and stores the acquired information data into the information data storing section 186.

The information data addressed to the user A includes at least the addressee that is the user A, information identifying the game being played by the user D, an invitation message "You have an invitation from Yamada" to the user A, and the type ID of the message. Whereas it was explained above that the information data addressed to the user A is generated by the management server 15, the information data may alternatively be generated by the information processing apparatus 14.

Figure 14:
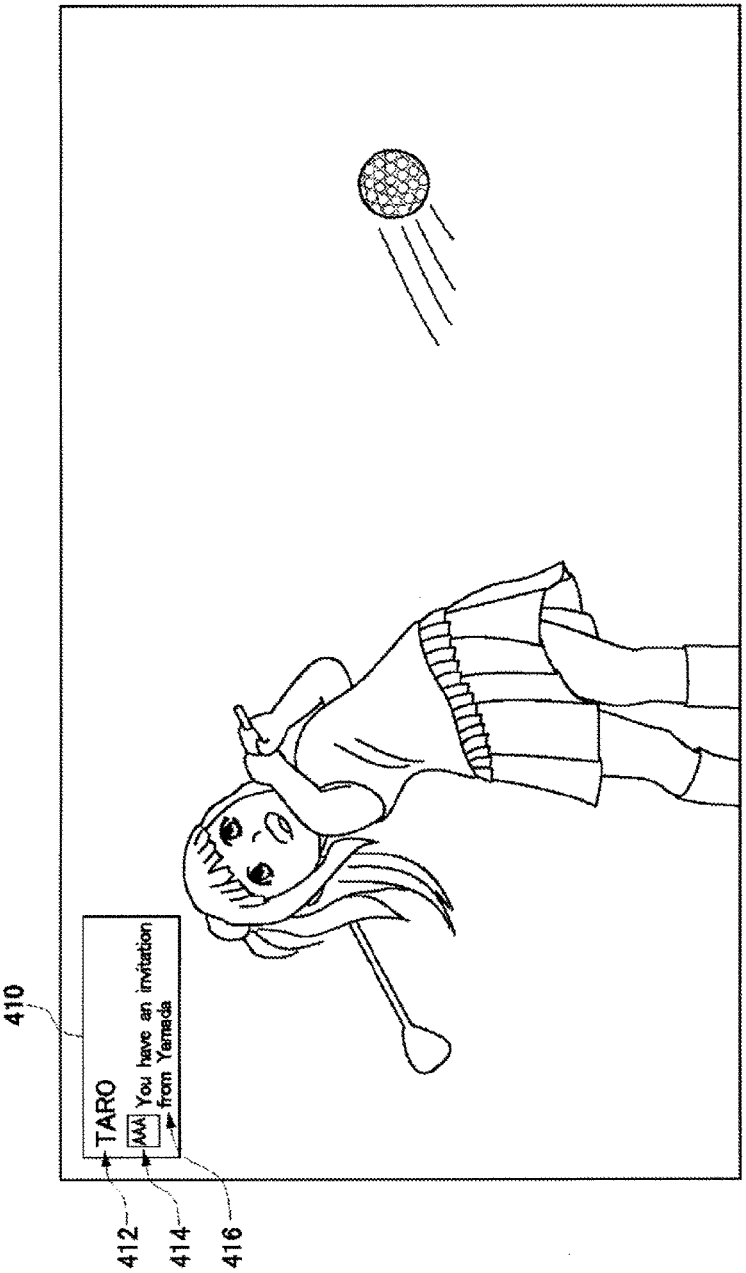

FIG. 14 shows an example in which the notification processing section 160 gives notification when multiple users have logged in. The notification processing section 160 generates a pop-up window 410 in the game screen. In the pop-up window 410, the notification processing section 160 displays the information addressed to the user A. As illustrated, the pop-up window 410 displays an invitation message 416, "You have an invitation from Yamada" as the information addressed to the user A. The invitation message 416 says that Yamada, who is the user D, is inviting the user A.

Also in the pop-up window 410, the notification processing section 160 displays user identification information 412 identifying the user A (TARO) as the addressee of the invitation message 416. Where the users A, B and C have logged in concurrently to the information processing apparatus 10, the user identification information 412 displayed in the pop-up window 410 allows the login users to recognize to whom the invitation message 416 is being addressed. The concurrent login of the users A, B and C means that these users are allowed to operate either the OS of the information processing apparatus 10 or the game executed on that OS; all the users A, B and C may or may not be playing the game together.

The login managing unit 130 manages the users logging in to the OS of the information processing apparatus 10 by having the login information stored in the login user storing section 182. Where the users A, B and C have concurrently logged in to the information processing apparatus 10, the login user storing section 182 stores the login users being the users A, B and C. Where there exist multiple users managed by the login managing unit 130, the notification processing section 160 thus determines that notification of the user identification information 412 is to be made. In this manner, while multiple users have logged in concurrently, the notification processing section 160 gives notification of not only the information addressed to a given user (invitation message 416) but also the user identification information 412 identifying the addressee of the information. This allows the multiple login users easily to recognize which of them is being addressed by the information.

Further, the notification processing section 160 displays in the pop-up window 410 a thumbnail image 414 of the game being played by the user D. This allows the user A to know the title of the game currently played by the user D.

The notification processing section 160 displays the pop-up window 410 for a predetermined time period of, say, five seconds. The display portion of the output device 4 displays the game screen generated by the application screen generating section 158. The reason for the limited display time is that leaving the pop-up window 410 displayed for a prolonged time period on the game screen generated by the application screen generating section 158 can disturb the progress of the game. It is also preferred that the pop-up window 410 be displayed as small as possible by the notification processing section 160 so as not to interfere with the progress of the game. The notification processing section 160 thus displays the thumbnail image of the title "AAA" as the information identifying the game, the image giving notification of the game played by the user D using a space smaller than if the title were displayed in text.

While the users A, B and C are playing the game, the acquisition processing section 120 may thus acquire an invitation message indicative of an invitation for another game being executed on another information processing apparatus 14. In that case, the notification processing section 160 displays the thumbnail image 414 and the invitation message 416 in the pop-up window 410 of the smallest possible size. This allows the user A instantaneously to know that he/she is being invited by user D to the game titled "AAA."

During notification of the information addressed to the user A, i.e., during display of the pop-up window 410, the user A may press the function button 80 of the input device 6. This causes the system screen generating section 154 to generate an invitation screen inviting the user A to the game session of the user D. The invitation screen may be what is in FIG. 12, for example (FIG. 12 shows an invitation screen by which Richard extends an invitation for the game session of the title "WARSHIP 2"). Upon display of the invitation message, pressing the function button 80 may be arranged to trigger transition to the invitation screen. This enables the user A instantaneously to respond to the invitation. With regard to messages other than the invitation message, arrangements may be made to execute transition to the menu screen.

In contrast, during notification of the information addressed to the user A, i.e., during display of the pop-up window 410, a user other than the user A (i.e., user B or C) may press the function button 80 of the input device 6. This causes the menu screen generating section 152 to generate a menu screen dedicated to the user who pressed the function button 80. If a login user presses the function button 80 while the pop-up window 410 is not displayed, the menu screen generating section 152 generates a menu screen dedicated to that login user. When the user A presses the function button 80 upon completion of display of the pop-up window 410, the menu screen for the user A is thus displayed on the output device 4.

Explained above was the example in which the pop-up window 410 is displayed when multiple users have concurrently logged in to the information processing apparatus 10. Described below is an example in which a pop-up window 420 is displayed when only one user has logged in to the information processing apparatus 10. It is assumed that the user A alone has logged in to the information processing apparatus 10 and that the user D invites the user A to the game session of the title "AAA."

As discussed above, the acquisition processing section 120, given push notification from the push server 17, acquires the information data addressed to the user A from the management server 15 via the network 3 and stores the acquired information data into the information data storing section 186. The information data addressed to the user A includes at least the addressee that is the user A, information identifying the game being played by the user D, an invitation message "You have an invitation from Yamada," and the type ID of the message.

FIG. 15 shows an example in which the notification processing section 160 gives notification when a single user has logged in. The notification processing section 160 generates the pop-up window 420 on the game screen, and displays information address to the user A in the pop-up window 420. As illustrated, an invitation message 426 is displayed in the pop-up window 420 as the information addressed to the user A. The invitation message 426 says that the addressee is being invited by Yamada that is the user D. The notification processing section 160 further displays in the pop-up window 420 a thumbnail image 424 of the game being played by the user D.

Compared with the pop-up window 410 shown in FIG. 14, the pop-up window 420 in FIG. 15 does not include the user identification information 412 identifying the addressee of the information as the user A. The user A knows that he/she is the only login user. There is thus no need to indicate in the pop-up window 420 that the invitation message is addressed to the user A. When notified of an invitation message, the user A recognizes that it is addressed to himself/herself. When only one user has logged in, the notification processing section 160 therefore gives notification of the information (invitation message) addressed to the user but does not give out the information identifying that user. This makes it possible to render the pop-up window 420 smaller in size than the pop-up window 410 giving notification of the user identification information 412. The user A is thus notified of the invitation message with the least possible interference with the progress of the ongoing game.

When only one user is managed as described by the login managing unit 130, the notification processing section 160 determines that notification of the user identification information 412 will not be given. That is, depending on whether one user is managed by the login managing unit 130 or multiple users are managed thereby, the notification processing section 160 determines whether or not to give notification of the user identification information. Where there are multiple login users, notification of the addressee of the information is given so that the login users will recognize to whom the information is addressed. Where there is one login user, notification of the addressee of the information is not given. This renders the pop-up window 420 smaller in size and reduces that area of the game screen which is hidden by the pop-up window 420.

The information data includes the type ID, as mentioned above. The invitation message may or may not have its addressee displayed in the pop-up window depending on whether there is one login user or there are multiple login users. In contrast, the download message or upload message, for example, need not have its addressee displayed in the pop-up window regardless of the number of login users. For example, the information data storing section 186 may store information by having its type ID associated with either the need to determine whether or not to display the addressee depending on the number of login users or with no need to display the addressee regardless of the number of login users. Given this arrangement, the notification processing section 160 may reference the type ID of the information to be displayed in the pop-up window before determining whether or not to display the addressee.

For messages such as download messages of which the addressees are not displayed in the pop-up window regardless of the number of login users, any user may be allowed to press the function button 80 of the input device 6 to display a screen common to all users associated with the message. The screen thus displayed may be a screen for viewing listed messages, for example. For the messages whose addressees are not displayed in the pop-up window, any user may thus be allowed to press the function button 80 to display the same screen during display of the pop-up window.

While the present invention has been described in conjunction with specific embodiment given as examples, it should be understood by those skilled in the art that the above-described composing elements and various processes may be combined in diverse ways and that such combinations, variations and modifications also fall within the scope of this invention.

With the above embodiment, it was explained that the user D having sent an invitation message to the user A may prepare an invitation cancel request to cancel the invitation and have the management server 15 transmit the invitation cancel message to the information processing apparatus 10 of the user A. Whereas the user D may thus be proactive in preparing the invitation cancel request, the information processing apparatus 10 of the user A may, upon displaying the invitation message, query the management server 15 or the information processing apparatus 14 whether the invitation is valid. The management server 15 manages whether the game session in the information processing system 1 is valid. In response to the query from the information processing apparatus 10, the management server 15 transmits information data indicating whether the invitation is valid or invalid. The information data indicative of invalidation is acquired by the acquisition processing section 120 as the invitation cancel message. In turn, the flag setting section 176 changes the valid flag to the invalid flag. Likewise, in response to the query from the information processing apparatus 10, the information processing apparatus 14 of the user D transmits the information data indicative of whether the invitation is valid or invalid to the information processing apparatus 10. For example, given the query from the information processing apparatus 10, the information processing apparatus 14 of the user D may display a screen querying the user D whether the invitation is still valid, before transmitting the response from the user D to the information processing apparatus 10 as information data.

REFERENCE SIGNS LIST

1 . . . Information processing system, 3 . . . Network, 4 . . . Output device, 5 . . . Server, 6 . . . Input device, 10, 14 . . . Information processing apparatus, 15 . . . Management server, 17 . . . Push server, 100 . . . Control block, 102 . . . Communication processing block, 110 . . . Operation receiving section, 120 . . . Acquisition processing section, 130 . . . Login managing unit, 132 . . . Login information receiving section, 134 . . . Login processing section, 140 . . . Application executing section, 150 . . . Screen generating unit, 152 . . . Menu screen generating section, 154 . . . System screen generating section, 156 . . . Login screen generating section, 158 . . . Application screen generating section, 160 . . . Notification processing section, 170 . . . Display processing unit, 172 . . . Information determining section, 174 . . . Information displaying section, 176 . . . Flag setting section, 180 . . . Registered user information holding section, 182 . . . Login user storing section, 184 . . . Application data holding section, 186 . . . Information data storing section.

INDUSTRIAL APPLICABILITY

The present invention is applicable to the field of information processing, including games.

The invention claimed is:

1. An information processing apparatus comprising:
an acquiring section configured to acquire invitation messages giving invitations to an application executable by the information processing apparatus and another information processing apparatus; and
a display processing unit configured to cause a display device to display the acquired invitation messages on the display device;
wherein valid invitation messages and invalid invitation messages are displayed in a manner different from each other;
wherein for each valid invitation message, after being sent to its recipient and prior to being displayed to its recipient as valid, its sender is prompted to confirm its validity;
wherein the application is a game and the game features sessions in which players are actively competing against one another;
wherein each valid invitation message is from its sender, who is a user of the another information processing apparatus playing the game and is playing in one of the sessions of the game when the invitation is received, to its recipient, who is a user of the information processing apparatus who is not in the one of the sessions of the game when the invitation is received, inviting the recipient to join the session in which the sender is playing, and which when accepted by the recipient causes the recipient to join the session in which the sender is playing;
wherein each invalid invitation message is a formerly valid invitation message that can no longer be accepted by its recipient due to its sender taking an action that causes its associated invitation to be cancelled, the action being one of initiating an invitation cancel request while playing in the session in which the sender is playing, and exiting the session in which the sender is playing.

2. The information processing apparatus according to claim 1, wherein an unread invitation message and a read invitation message are displayed in a manner different from each other.

3. The information processing apparatus according to claim 1, wherein the display processing unit causes the display device to display a plurality of the invitation messages in list form.

4. The information processing apparatus according to claim 3, wherein the display processing unit causes the display device to display the plurality of invitation messages in list form in two groups, one of the two groups including the valid invitation messages, the other group including the invalid invitation messages.

5. The information processing apparatus according to claim 4, wherein the display processing unit causes the display device to display the plurality of invitation messages in a predetermined order in each of the groups.

6. The information processing apparatus according to claim 3, wherein the display processing unit causes the display device to display the plurality of invitation messages in accordance with display priorities.

7. The information processing apparatus according to claim 6, wherein the display processing unit determines the priorities in accordance with which the invitation messages are to be displayed.

8. The information processing apparatus according to claim 1, wherein information identifying an inviting user is displayed in association with each of the invitation messages.

9. The information processing apparatus according to claim 1, wherein a thumbnail image of the application is displayed in association with each of the invitation messages.

10. The information processing apparatus according to claim 1, wherein, when the acquiring section acquires an invitation cancel message, the display processing unit causes the display device to display the invitation cancel message as an invalid invitation message.

11. The information processing apparatus according to claim 1, wherein, when an invitation message is selected, a detail screen showing details of the selected invitation is displayed.

12. The information processing apparatus according to claim 11, wherein, when a valid invitation message is selected, the detail screen displays means for accepting the selected invitation.

13. The information processing apparatus according to claim 12, wherein, when an invalid invitation message is selected, the detail screen displays no means for accepting the selected invitation.

14. A method for an information processing apparatus to display an invitation message, the method comprising:
acquiring invitation messages giving invitations to an application executable by the information processing apparatus and another information processing apparatus; and causing a display device to display valid invitation messages and invalid invitation messages in a manner different from each other;

wherein for each valid invitation message, after being sent to its recipient and prior to being displayed to its recipient as valid, its sender is prompted to confirm its validity;

wherein the application is a game and the game features sessions in which players are actively competing against one another;

wherein each valid invitation message is from its sender, who is a user of the another information processing apparatus playing the game and is playing in one of the sessions of the game when the invitation is received, to its recipient, who is a user of the information processing apparatus who is not in the one of the sessions of the game when the invitation is received, inviting the recipient to join the session in which the sender is playing, and which when accepted by the recipient causes the recipient to join the session in which the sender is playing;

wherein each invalid invitation message is a formerly valid invitation message that can no longer be accepted by its recipient due to its sender taking an action that causes its associated invitation to be cancelled, the action being one of initiating an invitation cancel request while playing in the session in which the sender is playing, and exiting the session in which the sender is playing.

15. A non-transitory, computer readable recording medium containing a computer program, which when executed by a computer, causes the computer to carry out actions, comprising:

causing a display device to display acquired invitation messages giving invitations to an application executable by the computer and another computer;

wherein the displaying includes displaying valid invitation messages and invalid invitation messages in a manner different from each other;

wherein for each valid invitation message, after being sent to its recipient and prior to being displayed to its recipient as valid, its sender is prompted to confirm its validity;

wherein the application is a game and the game features sessions in which players are actively competing against one another;

wherein each valid invitation message is from its sender, who is a user of the another computer playing the game and is playing in one of the sessions of the game when the invitation is received, to its recipient, who is a user of the computer who is not in the one of the sessions of the game when the invitation is received, inviting the recipient to join the session in which the sender is playing, and which when accepted by the recipient causes the recipient to join the session in which the sender is playing;

wherein each invalid invitation message is a formerly valid invitation message that can no longer be accepted by its recipient due to its sender taking an action that causes its associated invitation to be cancelled, the action being one of initiating an invitation cancel request while playing in the session in which the sender is playing, and exiting the session in which the sender is playing.

* * * * *